May 7, 1968 E. J. RIPLING ETAL Re. 26,389

BACK-UP ROLL CONSTRUCTION

Original Filed Oct. 30, 1963

2 Sheets-Sheet 1

INVENTORS
Edward J. Ripling
BY Sheldon Mostovoy
Dome, McDougall & Hersh
Attys

INVENTORS
Edward J. Ripling
BY Sheldon Mostovoy
Ooms, McDougall & Hersh
Att'ys

United States Patent Office

Re. 26,389
Reissued May 7, 1968

26,389
BACK-UP ROLL CONSTRUCTION

Edward J. Ripling, Flossmoor, and Sheldon Mostovoy, Chicago, Ill., by Materials Research Laboratory, Inc., assignee, Richton Park, Ill., a corporation of Delaware Original No. 3,269,163, dated Aug. 30, 1966, Ser. No. 320,059, Oct. 30, 1963. Application for reissue Feb. 20, 1967, Ser. No. 628,512
16 Claims. (Cl. 72—163)

Matter enclosed in heavy brackets [ ] appears in the original patent but forms no part of this reissue specification; matter printed in italics indicates the additions made by reissue.

*ABSTRACT OF THE DISCLOSURE*

*A construction including work rolls provided for contacting sheets of material moving relative to the work rolls. At least one back-up roll is provided for engaging an associated work roll, and gear teeth are formed in at least a portion of the periphery of the back-up roll. The gear teeth are located intermediate the ends of the back-up roll with at least some of the gear teeth being positioned at points immediately opposite working surfaces of the work roll. A rack or other supporting rolls mesh with the gear teeth to thereby eliminate bending of the back-up roll and consequently of the work rolls.*

This invention relates to a construction for back-up rolls to be used in combination with work rolls. Specifically, the invention is concerned with the provision of unique back-up rolls and means associated therewith which will act to counteract detrimental deflection in the work rolls.

It is well known that in various operations employing rolls, it is necessary to provide back-up rolls. The use of such back-up rolls is perhaps best understood with reference to the metal working industry. Thus, in the case of roller levelers, metal reducing roll stands and in other applications, it is desirable to provide back-up rolls so that the proper application of force by work rolls will be provided. The concepts of this invention will be described hereinafter with respect to metal working; however, it will be understood that these concepts are applicable to other industries. Thus, the major considerations involved herein concern the use of the back-up rolls in combination with work rolls which in turn engage material passing relative thereto. The type of material engaged by the work rolls is not critical to the functioning of the back-up rolls. Any system which imparts stresses to the work rolls which are advantageously counteracted by the back-up means to be described is contemplated by this disclosure.

In considering the metal working industry, it is well known that there are many instances where small diameter work rolls are desirable. For example, in the case of a roller leveler, small diameter work rolls are preferably employed since these work rolls increase the amount of bending or flexing which can be imparted to metal sheet. The need for these rolls is particularly apparent where sheet of thin gauge is being handled. Thus, if large diameter rolls are employed on such sheet, the flexing stresses introduced are quite small when compared to the stresses introduced by smaller diameter rolls.

The use of small diameter rolls is difficult where the sheet to be handled is relatively wide. Thus, wider sheet requires correspondingly wider rolls and there is a tendency for bending of the rolls in the course of relative movement with respect to the sheet. In the case of roller leveling operations, the sheet is normally pulled through the apparatus, and there is a clear tendency toward bending of the rolls in the direction of movement. Where bending occurs, non-uniform flexing results and bowing or other undesirable configurations will result in the final product.

Similar bending of work rolls tends to occur in rolling mills where the object is to reduce the thickness of the metal sheet. In such cases, as in the case of roller levelers, the use of backup rolls has been attempted as a means for reducing the bending tendency. Such back-up rolls have been effective to a certain extent, however, it has been found that conventional designs are ineffective, particularly where relatively long rolls of small diameter are desirably employed.

It is an object of this invention to provide a system including back-up rolls which is extremely efficient with regard to the minimizing of bending tendencies in material handling operations.

It is a further object of this invention to provide a system of the type described in the foregoing object which is particularly suitable for use in applications employing long work rolls of relatively small diameter.

It is a particular object of this invention to provide systems of the type described in the foregoing objects which are particularly suitable for the handling of metal sheet in metal flexing and reducing operations.

These and other objects of this invention will appear hereinafter, and for purposes of illustration but not of limitation, specific embodiments of this invention are shown in the accompanying drawings in which.

The construction of this invention generally comprises an assembly including work rolls and back-up rolls for engaging at least part of the work rolls. The back-up rolls of this invention are designed whereby additional means can be associated with the back-up rolls to counteract forces which tend to bend the work rolls. Specifically, the instant invention provides for the formation of gear teeth in at least a portion of the periphery of at least some of the back-up rolls. These gear teeth are formed intermediate the supported ends of the back-up rolls and corresponding teeth are formed in the means which are associated with the back-up rolls.

In accordance with one form of this invention, rack means are associated with the back-up rolls. These rack means engage gear teeth locations in the back-up rolls to thereby provide intermediate support for the back-up rolls. The back-up rolls are, therefore, effectively divided into small sections with each section being supported at its ends. By reason of this support, the tendency to bend in any of the given sections is materially reduced. The engagement of these back-up rolls with the work rolls provides for corresponding reduction in the bending tendency of the work rolls. It has been observed that the amount of bending increases as the length of any given section increases. Accordingly, if a gear teeth location is formed in the middle of a back-up roll and supported by an associated rack means to divide the back-up roll into two equal sections, the bending tendency will be significantly reduced. Since any number of such intermediate supports can be provided, it will be obvious that the bending tendency can be reduced to a negligible amount. As will appear hereinafter, the instant invention contemplates the provision of gear teeth all across the back-up rolls whereby support will be complete.

In addition to the rack means referred to, the instant invention contemplates the provision of large rolls having gear teeth defined therein which intermesh with gear teeth in the back-up rolls. These large rolls can be provided to give support at separate locations intermediate the ends of a back-up roll or a single large roll can be threaded to provide support all across the length of a back-up roll.

As will appear from the examples provided herein, the rack means, or large supporting rolls, can be designed to intermesh with a plurality of back-up rolls. The large variety of arrangements which are possible in accordance with this invention permits the use of the invention for any application employing work rolls. In the case of the metal working industry, the use of the concepts of this invention in roller levelers, in metal flexing constructions and in metal reducing constructions is easily accomplished.

Figure 1:
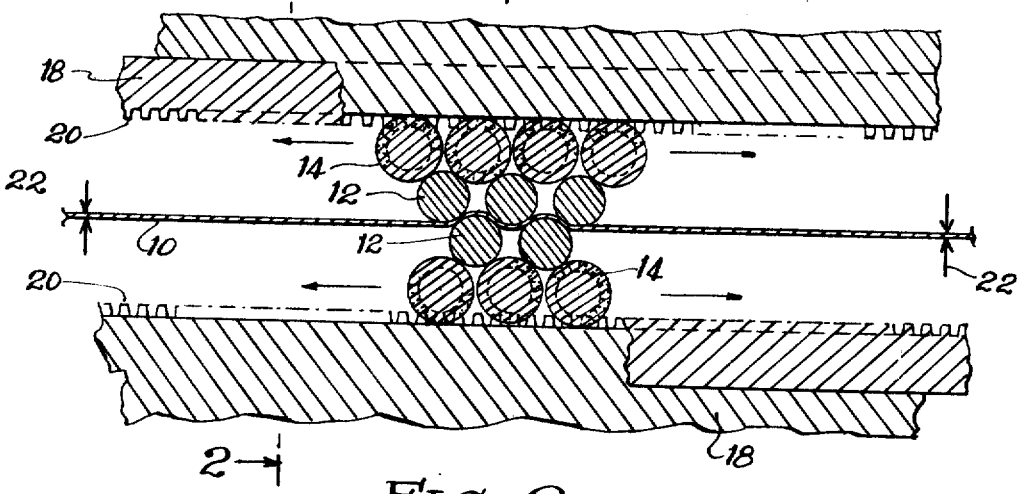
FIGURE 1 is a schematic illustration in vertical section of a construction including the back-up means of this invention.

FIGURE 1 of the accompanying drawings illustrates a metal sheet 10 which is to be flexed by means of the work rolls 12. These work rolls are rotatably supported at their ends, and it will be noted that the upper peripheries of the lower pair of rolls are in a plane above the lower peripheries of the upper rolls. This relationship provides for the imparting of flexing movement to the sheet as it passes relative to the rolls.

Figure 2:
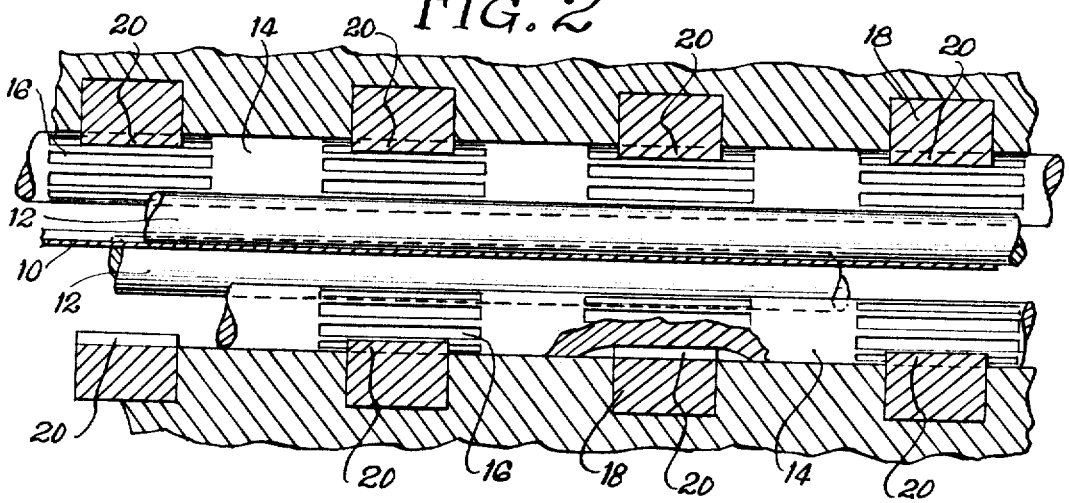
FIGURE 2 is an enlarged sectional view taken about the line 2—2 of FIGURE 3.
Figure 3:
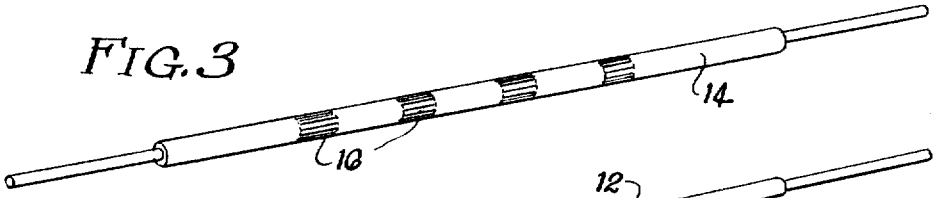
FIGURE 3 is a perspective view of one design for a back-up roll suitable for use in the construction of FIGURE 1.
Figure 4:
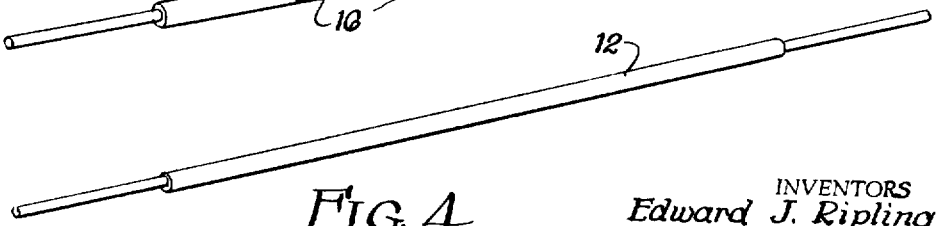
FIGURE 4 is a perspective view of a work roll of the type suitable for use in construction of FIGURE 1.

A plurality of back-up rolls 14 are associated with the work rolls. These back-up rolls define gear teeth 16 as best shown in FIGURE 2. Located above and below the respective back-up rolls are rack means 18. The teeth 20 defined by these rack means intermesh with the teeth 16 defined by the back-up rolls. In one embodiment of this invention, the ends of the rolls 12 and 14 are journalled for rotatable movement in a stationary member. The rack means, on the other hand, are mounted for reciprocal movement and the rack means can thus be moved relative to the roll cluster. With the sheet, clamped at each end as suggested by the arrows 22, and with the clamping means tied to the rack, the desired flexing can be imparted to the sheet. It will be appreciated, however, that corresponding flexing of the sheet could be accomplished by moving the roll cluster relative to the rack and sheet.

In considering the construction of FIGURE 1, it will be appreciated that the work rolls 12 are supported against any bending tendency. In this connection, the movement of these work rolls relative to the sheet will introduce forces which tend to bend the rolls between the supported ends. The amount of bending which is permitted will depend on the bending permitted in the back-up rolls. It will be noted that these back-up rolls are also quite small in diameter and this is necessary in order to permit engagement with the surfaces of the work rolls in the manner illustrated. The support of the back-up rolls by means of the racks 18 effectively eliminates any bending tendency in the back-up rolls. In the embodiment illustrated, the four gear locations 16 divide the back-up rolls into five short sections each of which is supported at its ends. Since each of these sections is relatively short compared to the dameter of the back-up rolls, it will be apparent that a material reduction in any bending tendency can be accomplished.

Figure 5:
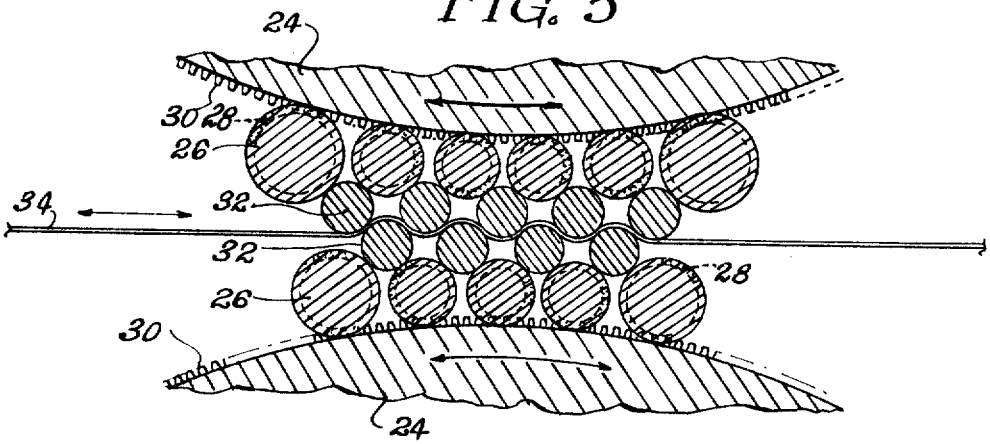
FIGURE 5 is a schematic illustration in vertical section of an alternative construction embodying the characteristics of this invention.

FIGURE 5 illustrates a modification of the invention wherein large rolls 24 are employed for engaging back-up rolls 26. Each of the back-up rolls defines teeth 28 which intermesh with the teeth 30 of the large rolls. The back-up rolls in turn engage work rolls 32 imparting flexing movement to the sheet 34.

In considering FIGURE 5, it will be noted that the back-up rolls comprise central rolls of relatively small diameter with the rolls on either side thereof being of progressively increasing diameter. In the arrangement shown, the back-up rolls 26 are dimensioned whereby the upper peripheries of the upper group and the lower peripheries of the lower group define an arc corresponding to the outer surface of the large rolls 24. Accordingly, the rolls 24 serve to support each of the back-up rolls.

In an embodiment of the type shown in FIGURE 5 and in the case of the other described embodiments as well as modifications thereof, the gear teeth on the back-up rolls can be formed at separated locations or they can be defined continuously across the back-up rolls. Similarly, the large rolls 24 can include separate gear locations or they may be provided with gear teeth over their entire length.

Figure 6:
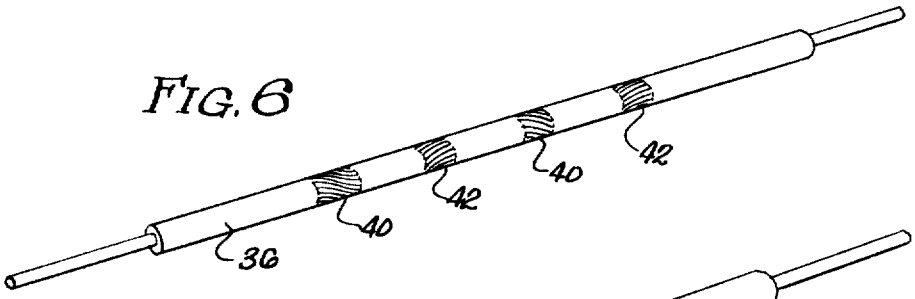
FIGURE 6 is a perspective view of a modified form of back-up roll.
Figure 7:
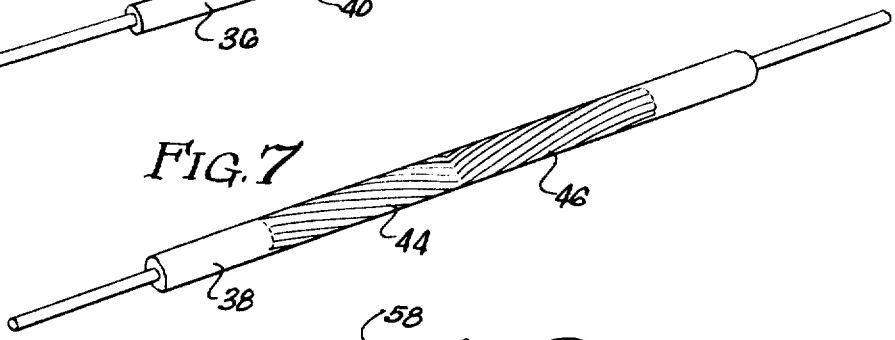
FIGURE 7 is a perspective view of an additional modified form of back-up roll.

FIGURES 6 and 7 illustrate back-up rolls 36 and 38 which define alternative gear patterns. In the case of the roll 36, any two combined gear locations 40 and 42 define a herringbone pattern. With corresponding gears defined in the surface of a rack or large supporting roll, an effective support for the back-up rolls will be provided. With a pattern of this type, a good gripping relationship between the support and the back-up rolls is achieved and there is less tendency toward marking of the work rolls in the area contacting the back-up rolls. FIGURE 7 defines gear patterns 44 and 46 which provide a herringbone design and which cover the substantial length of the roll 38. It will be appreciated that the symmetry which characterizes the herringbone designs illustrated need not be employed since gear patterns defining oppositely directed helical gears in one or more locations are clearly conceivable. In this connection, it will be noted that the angular disposition of the gear teeth which is contemplated by this invention tends to eliminate lateral shifting of the rolls during their operation. Thus, angular gear patterns which are aligned in different directions cooperate to prevent such lateral shifting.

Figure 8:
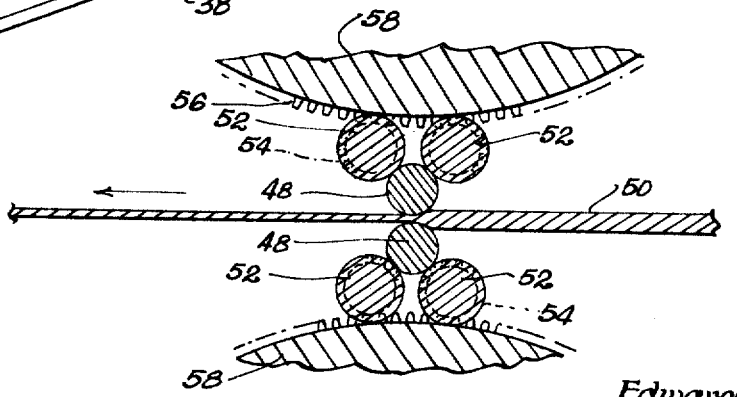
FIGURE 8 is a schematic illustration in vertical section of an additional alternative construction embodying the characteristics of this invention.

As previously indicated, the concepts of this invention can be applied to reducing mill constructions. FIGURE 8 illustrates work rolls 48 which are provided for reducing the thickness of sheet 50. Each of the work rolls 48 is engaged by back-up rolls 52 which define gear teeth 54. These gear teeth intermesh with gear teeth 56 on large support rolls 58. The reduction in bending tendency can be achieved to a substantial degree in a construction of this nature. Furthermore, it will be apparent that the mill design illustrated is of a relatively simple nature. There is no need for a large number of back-up rolls in the roll cluster and, accordingly, economies are possible where the use of this invention is contemplated.

As clearly pointed out above, the instant invention provides clear advantages with respect to any tendency toward deflection in the rolls of a material handling system. It has also been found that the instant invention provides distinct advantages with regard to driving of the rolls in an assembly. In many operations where large back-up rolls are provided, the drive means are directly connected to these rolls. Driving of associated rolls is therefore dependent upon the frictional contact of the back-up rolls with the associated rolls. Accordingly, problems involving slippage have been encountered. With the system of the instant invention there is a positive drive provided between the back-up rolls and the associated rolls due to the gear teeth employed. Accordingly, slippage between these rolls can obviously be eliminated.

The actual movement of the sheet or other material through the roll assembly can be accomplished in any conventional manner. Thus, the driving of the work rolls themselves may be undertaken or the sheet can be pulled through the work rolls. A combination of these procedures, such as where the take-up reel pulls on the sheet while the work rolls drive the sheet through is also contemplated.

It will be appreciated that the following claims when referring to the elimination of bending stresses are concerned with such stresses in the area of the work rolls which contact the material being handled. Thus, it is possible that bending could occur at the extreme ends of the rolls such as at the locations where the rolls are journalled in a roll support.

Various modifications of the constructions illustrated will be obvious to those skilled in the art. It will be apparent that gear teeth could be eliminated on some back-up rolls, and it will also be understood that the inventive concepts could be applied where other rolls are employed intermediate the work rolls and the back-up rolls defining the gear teeth. Constructions of the type described herein can also be utilized in combination with various conventional material handling techniques.

It will be apparent that various other changes and modifications can be made in the above described constructions which provide the characteristics of this invention without departing from the spirit thereof particularly as defined in the following claims.

That which is claimed is:

1. In a construction wherein work rolls are provided for contacting material moving relative thereto, the improvement comprising at least one back-up roll for engaging an associated work roll, gear teeth in at least a portion of the periphery of said back-up roll, *said gear teeth being provided at locations* intermediate the ends *of the back-up roll with at least some of the gear teeth positioned at points immediately opposite working surfaces of the work roll* [thereof], and means in said construction meshing with said gear teeth, said last mentioned means tending to eliminate bending of said back-up roll whereby bending of the associated work roll can be eliminated by said back-up roll.

2. A construction in accordance with claim 1 wherein said means meshing with said gear teeth comprise movable rack means, means for holding said material in position relative to said rack means, and wherein said work roll and said back-up roll are mounted in a stationary assembly, and means for moving said rack means and said material relative to said assembly.

3. A construction in accordance with claim 1 wherein said means meshing with said gear teeth comprise at least one roll substantially larger in diameter than said backup roll, and means for driving said material through said construction relative to said work roll.

4. A construction in accordance with claim 1 wherein said means meshing with said gear teeth comprise stationary rack means, means for holding said material in a stationary position in said construction, and wherein said work roll and said back-up roll are mounted in an assembly adapted to be moved relative to said material.

[5. A construction in accordance with claim 1 wherein said means meshing with said gear teeth comprise movable rack means, means for holding said sheet in fixed relationship with respect to said rack means, said work rolls and said back-up rolls being mounted in a stationary assembly, and means for moving said rack means and said sheet relative to said assembly.]

6. In a construction wherein work rolls are provided for contacting material moving relative thereto, and including means for rotatably supporting the work rolls at each end, the improvement comprising at least one back-up roll for engaging each associated work roll, means for rotatably supporting the back-up rolls at either end thereof, gear teeth defined in at least a portion of the periphery of at least some of the back-up rolls, said gear teeth being defined intermediate the ends of said back-up rolls *with at least some of the gear teeth positioned at points immediately opposite working surfaces of the work roll, and* means in said construction meshing with said gear teeth, said last mentioned means preventing bending of said back-up rolls whereby bending of said work rolls can be prevented by said back-up rolls.

7. A construction in accordance with claim 6 wherein said material comprises metallic sheet and wherein said work rolls comprise a plurality of flexing rolls adapted to flex the sheet moving therethrough.

8. A construction in accordance with claim 7 wherein said means meshing with said gear teeth comprise at least one roll substantially larger in diameter than said back-up rolls, and means for driving said sheet relative to said work rolls.

9. A construction in accordance with claim 8 wherein a group of back-up rolls is disposed on each side of the path of movement of said sheet, each group comprising central rolls and additional rolls of progressively increasing diameter on either side of said central rolls, one of said large diameter rolls being provided for each of said groups and each of said large diameter rolls meshing with each back-up roll in its associated group.

10. A construction in accordance with claim 6 wherein said work rolls comprise a pair of opposed reducing rolls and including two back-up rolls engaging the periphery of each of said work rolls.

11. A construction in accordance with claim 10 wherein said means meshing with said gear teeth comprise one roll substantially larger in diameter than said back-up rolls, one of said large diameter rolls being associated with each set of said back-up rolls.

12. A construction in accordance with claim 6 wherein said gear teeth are formed in a plurality of separate locations between the ends of said back-up rolls.

13. A construction in accordance with claim 12 wherein the gear teeth of any two neighboring locations define a herringbone pattern.

14. A construction in accordance with claim 12 wherein the gear teeth formed in said locations define an angular pattern with respect to the axes of said back-up rolls.

15. A construction in accordance with claim 6 wherein the gear teeth extend substantially completely across said back-up rolls.

16. A construction in accordance with claim 15 wherein said gear teeth are divided into at least two different sections with each adjoining sections defining a herringbone pattern.

*17. A construction in accordance with claim 7 wherein said means meshing with said gear teeth comprise movable rack means, means for holding said sheet in fixed relationship with respect to said rack means, said work rolls and said back-up rolls being mounted in a stationary assembly, and means for moving said rack means and said sheet relative to said assembly.*

References Cited

The following references, cited by the Examiner, are of record in the patented file of this patent or the original patent.

UNITED STATES PATENTS 1,968,389 7/1934 Guthrie ---------- 72—163

FOREIGN PATENTS 867,832 5/1961 Great Britain.

CHARLES W. LANHAM, *Primary Examiner.*

R. D. GREFE, *Assistant Examiner.*